(12) United States Patent
Jacobine et al.

(10) Patent No.: US 10,703,836 B2
(45) Date of Patent: Jul. 7, 2020

(54) SYNTHESIS OF FUNCTIONALIZED POLYISOBUTYLENES

(71) Applicant: Henkel IP & Holding GmbH, Duesseldorf (DE)

(72) Inventors: Anthony F. Jacobine, North Haverhill, NH (US); Andrew D. Messana, Newington, CT (US); Laxmisha Sridhar, Monmouth Junction, NJ (US); Sean M. Burdzy, Hamden, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 29 days.

(21) Appl. No.: 15/877,494

(22) Filed: Jan. 23, 2018

(65) Prior Publication Data

US 2018/0148523 A1 May 31, 2018

Related U.S. Application Data

(63) Continuation of application No. PCT/US2016/043468, filed on Jul. 22, 2016.

(60) Provisional application No. 62/198,713, filed on Jul. 30, 2015.

(51) Int. Cl.

| | | |
|---|---|---|
| *C08F 110/10* | (2006.01) | |
| *C08F 8/04* | (2006.01) | |
| *C08F 8/06* | (2006.01) | |
| *C08F 8/14* | (2006.01) | |
| *C08G 18/81* | (2006.01) | |
| *C08G 18/24* | (2006.01) | |
| *B01J 31/02* | (2006.01) | |
| *C08F 8/50* | (2006.01) | |
| *C08G 18/75* | (2006.01) | |
| *B01J 21/06* | (2006.01) | |
| *C08F 210/12* | (2006.01) | |
| *C08G 18/62* | (2006.01) | |

(52) U.S. Cl.
CPC ............ *C08F 110/10* (2013.01); *B01J 21/063* (2013.01); *B01J 31/0227* (2013.01); *C08F 8/04* (2013.01); *C08F 8/06* (2013.01); *C08F 8/14* (2013.01); *C08F 8/50* (2013.01); *C08F 210/12* (2013.01); *C08G 18/246* (2013.01); *C08G 18/6204* (2013.01); *C08G 18/755* (2013.01); *C08G 18/8116* (2013.01); *C08F 2800/10* (2013.01); *C08F 2810/30* (2013.01); *C08F 2810/40* (2013.01)

(58) Field of Classification Search
CPC .. C08F 8/04; C08F 8/06; C08F 110/10; C08F 210/12
See application file for complete search history.

(56) References Cited

U.S. PATENT DOCUMENTS

| | | |
|---|---|---|
| 4,118,427 A | 10/1978 | Rhein et al. |
| 4,524,188 A | 6/1985 | Kennedy et al. |
| 4,786,586 A | 11/1988 | Lee et al. |

FOREIGN PATENT DOCUMENTS

| | | |
|---|---|---|
| JP | H07102017 A | 4/1995 |
| JP | 2012102243 A | 5/2012 |
| WO | 0032645 A1 | 6/2000 |
| WO | 2008066914 A1 | 6/2008 |

OTHER PUBLICATIONS

Dole-Robbe, CAPLUS abstract No. 1967:29814 Action of ozone on the double bonds of isobutylene-isoprene copolymers in the presence of dibutyl sulfide. II. Peroxidation of the copolymers and heat stability of the peroxidation products, Bulletin de la Societe Chimique de France (1966), (10), 3160-6.*
International Search Report for International PCT Patent Application No. PCT/US2016/043468 dated Nov. 3, 2016.
E. B. Jones et al., "Alpha,omega-Glycols from Isobutylene and Some Derived Block Copolymers", Journal of Polymer Science: Part A, vol. 2, No. 12, Dec. 1964, pp. 5313-5318.

* cited by examiner

*Primary Examiner* — Jeffrey C Mullis
(74) *Attorney, Agent, or Firm* — James E. Piotrowski

(57) ABSTRACT

Disclosed is a simplified process for formation of polyisobutylene functionalized with at least one terminal primary or secondary alcohol. The process comprises subjecting an olefin functional polyisobutylene, butyl rubber, or mixtures thereof to ozonation and reduction thereby forming monoalcohol and diol functional polyisobutylene. The formed functional polyisobutylenes can serve as precursors for many other functionalized polyisobutylenes including urethane polyisobutylenes, urethane polyisobutylenes capped with (meth)acrylate functions, and (meth)acrylate capped polyisobutylenes.

14 Claims, No Drawings

SYNTHESIS OF FUNCTIONALIZED POLYISOBUTYLENES

TECHNICAL FIELD

This invention relates generally to polymers of polyisobutylene and more particularly to methods for making functionalized polyisobutylenes.

BACKGROUND OF THE INVENTION

Pure polyisobutylene (PIB) is a synthetic form of rubber that is a homopolymer of isobutylene and it finds use in many areas of commerce. When the PIB includes groups other than just isobutylene it is still often referred to as PIB when isobutylene is the predominant monomer found in the polymer. Closely related to polyisobutylene is butyl rubber, also a synthetic rubber, which comprises a copolymer of isobutylene and isoprene. In a typical formulation of butyl rubber the composition has 90 to 99.2 mole % isobutylene units and 10 to 0.8 mole % isoprene units. The long segments of polyisobutylene provide excellent flex properties to the butyl rubber. Isobutylene can be polymerized into PIBs having sizes ranging from low molecular weights of 1,000 or less to very high molecular weights of up to 100,000, 400,000 or even higher. Varieties of polyisobutylene are commercially available that are termed highly functionalized PIB, meaning that they include a high percentage of polymer chains that have carbon to carbon double bonds at or very near the terminal ends. One example of such a commercial product is the Glissopal® group of PIBs from BASF which have an alpha-olefin content of greater than 70%. The polyisobutylenes and butyl rubber find use in a wide range of products including in the manufacture of adhesives, fuel cell gaskets, fuel additives, lubricants, agricultural products, paper and pulp, sealing of equipment, caulks, sealants, cling film, and chewing gum. In many of these products and methods of manufacture the polyisobutylene or butyl rubber serves as a starting material that is modified into one or more precursor products that can be further modified to provide useful benefits in the end products. One group of precursor products are polyisobutylenes having one or more primary or secondary hydroxyl functional groups on their terminal ends. These precursors can be further functionalized to include polyurethane segments followed by capping with methacrylate units or they can be directly converted to methacrylate capped polyisobutylenes.

One of the traditional processes for formation of a methacrylate functional PIB is ring opening of PIB succinic anhydride (PIBSA) with hydroxyl functional acrylates or hydroxyl functional methacrylates under base catalysis. The functionality in the methacrylate functionalized product is dependent on the anhydride functionality present in the PIBSA starting material. Commercially available PIBSA is obtained by an ene reaction of a highly functionalized PIB. Many of the highly functionalized PIBs have a mixture of exo double bond and endo double bond content. The endo double bonds are unreactive in the ene reaction, so the PIB acrylate polymer obtained by the typical PIBSA route has a reduced functionality depending on the endo double bond content of the starting material.

One process for formation of terminal alcohol functionalized PIB, especially mono or di alcohol functional PIB, starts with a diallyl functional PIB and subjects it to a hydroboration and oxidation step to produce the alcohol functional PIB. The allyl group comprises a terminal sequence of [—$CH_2CH$=$CH_2$]. Problems with this procedure include considerable processing during the procedure such as multiple filtration steps and solvent exchanges. The resulting alcohol functional PIB often contains undesirable by products of the hydroboration reagents used, for example the reagent 9-borabicyclo[3.3.1.]nonane (9-BBN), which can lead to formation of cyclooctanediol. These by products are difficult to use and must be removed prior to any subsequent reaction steps such as esterification using (meth) acryloyl halide compounds to produce diacrylate PIBs as discussed below. These issues have been handled in the past by incorporating into the procedure multiple washes, solvent exchanges, and multiple filtrations.

Formation of a diacrylate PIB from a diol functional PIB precursor has been accomplished in the past by subjecting the alcohol functional PIB to an esterification reaction using (meth)acryloyl halides to form the di(meth)acrylate PIB. The process esterifies the diol functional PIB using acryloyl chloride and an amine. Problems with this approach include formation of colored products that are difficult to remove, esterification of low molecular weight by products, like cyclooctanediol from the 9-BBN reagent, in the alcohol formation step that may not have been fully removed in the hydroboration step, to cyclooctanediol diacrylate. These cyclooctanediol diacrylates can lead to performance issues in the products that incorporate the diacrylate PIB. So the cleanup procedures in the formation of the diol PIB precursor directly affect the products produced in the esterification step.

It is desirable to provide a simplified method for formation of mono and di alcohol functional PIBs that has fewer by products. It is desirable to create a process that allows for direct use of the alcohol functional PIB in a reaction for formation of polyurethane PIBs capped with acrylate functions or to directly form PIBs capped with acrylate functions.

SUMMARY OF THE INVENTION

In general terms, this invention provides PIBs that are functionalized with a variety of functional groups. The produced PIBs can range from high molecular weight functional PIBs having molecular weights of 12,000 Daltons or greater, medium molecular weight functional PIBs having molecular weights of from 6,000 to 12,000 Daltons, and low molecular weight functional PIBs having molecular weights of 6,000 Daltons or less.

In one embodiment the present invention comprises a method of forming a functional polyisobutylene having at least one terminal primary or secondary hydroxyl group comprising the steps of providing at least one polymer selected from the group consisting of: an olefin functional polyisobutylene, the olefin functional polyisobutylene optionally including at least one internal phenyl group; butyl rubber; and mixtures thereof; solubilizing the polymer in an organic solvent to form a polymer solution; subjecting the polymer solution to ozonation by bubbling ozone through the polymer at a temperature in the range of from +10° C. to a temperature that is greater than the freezing temperature of the polymer solution, optionally in the presence of a sulfide catalyst; and treating the product of the ozonation step at a temperature of from 0 to 100° C. in the presence of a reducing agent thereby forming a functional polyisobutylene having at least one terminal primary or secondary hydroxyl group. The formed functional polyisobutylene can then be used as a precursor in a variety of additional functionalization reactions as described herein.

These and other features and advantages of this invention will become more apparent to those skilled in the art from the detailed description of a preferred embodiment.

DETAILED DESCRIPTION OF A PREFERRED EMBODIMENT

The present invention is directed toward creation of functionalized polyisobutylenes (PIBs) derived from starter PIBs that have endo or exo carbon to carbon double bonds, allyl groups, or butyl rubber, having mono or di alcohol functionality on their terminal ends. Examples of starter PIBs having endo and exo carbon to carbon double bonds include the Glissopal® PIBs from BASF. Examples of PIBs with allyl groups include the Epion group of PIBs from Kaneka. The present invention further comprises reaction procedures for conversion of these alcohol functionalized PIBs to form other PM precursor products such as polyurethane PIB hybrids, polyurethane PIB hybrids capped with acrylate, acrylate capped PIBs, and other functionalized PIBs.

The following definitions apply in the present specification and claims unless noted otherwise. Polyisobutylenes abbreviated as "PIBs", refers to a homopolymer of isobutylene units. In the present specification and claims when a PIB has been modified by addition of other functional groups, be they, isoprene monomers as in butyl rubber, alcohol functions, carbon to carbon double bonds, urethanes, (meth)acrylates, acrylates, styrenes or any other functional groups they will be referred to as "functional PIBs". There are commercially available functional PIBs, such as the Glissopal® PIBs from BASF, that include terminal carbon to carbon double bond functional groups at one or both terminal ends, these are referred to in the present specification as "olefin functional PIBs". The terminal carbon to carbon double bonds can be found as "endo" or as "exo" double bonds having a structure of [—CH═C(CH$_3$)$_2$] or [—CH$_2$—C(CH$_3$)═CH$_2$], respectively. Other commercially available "olefin functional PIBs" include the terminal carbon to carbon double bonds as allyl terminal groups, as understood in the art, these "allyl groups" have the structure [—CH$_2$CH═CH$_2$]. All of these PIBs with one or two terminal carbon to carbon double bond functional ends are referred to as "olefin functional PIBs" in the present specification and claims. There are commercially available functional PIBs that include, in addition to terminal allyl groups, at least one phenyl group in the polymer chain with two polyisobutylene blocks extending from the phenyl group, with a single phenyl group these have the structure [allyl-PIB-phenyl-PIB-allyl] and these are referred to in the present specification and claims as "olefin functional PIB phenyls". The number of polyisobutylene repeat units on either side of a phenyl is variable, but generally they are about equal. The term "butyl rubber" means a copolymer of isobuytylene and isoprene monomers, as understood by those of skill in the art, typically these copolymers include from 90 to 99.2 mole % isobutylene and 10 to 0.8 mole % isoprene. Especially preferred in the present invention are butyl rubbers having from 5 to 0.8 mole % isoprene units. The term "starter PIB" in the present specification and claims is intended, unless otherwise noted, to include all of the "functional PIBs" described above including those containing one or more phenyl groups and butyl rubber at the start of a reaction to further modify the "starter PIB". The term "(meth)acrylate" refers to all ester derivatives of the parent compound, (meth)acrylic acid, having the structure of [CH$_2$═C(CH$_3$)CO$_2$R], wherein the group R is H in the parent compound and is any $C_1$ to $C_{12}$ group, more preferably a $C_1$ to $C_6$ group, in the ester derivatives. In the ester derivatives the R can include the well-known groups methyl, ethyl, propyl, butyl, pentyl, hexyl, and phenyl. But the R group could also include $C_1$ to $C_{12}$ aliphatic groups, aromatic groups, alicyclic groups, and aralkyl groups. The compound PIB succinic anhydride is denoted by PIBSA. The term "mono or diol functional PIB" refers to the PIB with one or two terminal alcohol functionalities on it. A mono (meth)acrylate functional PIB is also termed as "PIB macromonomer. The following standard abbreviations are used: g for gram, L for liter, mg for milligram, ml for milliliter, and mmols for millimoles.

The present invention provides a simplified procedure for formation of mono and di alcohol functional PIBs starting from starter PIBs which are olefin functional PIBs. The starter PIBs can include, for example, olefin functional PIBs, olefin functional PIB phenyls, butyl rubber, and mixtures of these functional PIBs. In a first step the starter PIB is subjected to an ozonation reduction process. The process comprises solubilizing the starter PIB material in a solvent at an elevated temperature. The solution of solubilized starter PIB is then chilled to a temperature of +10° C. or less, preferably to a temperature below the flash point of the solvent. Generally this temperature ranges from about −4° C. down to about a temperature just above the freezing point of the solubilized starter PIB in the solvent. Then the temperature is maintained and ozone is bubbled through the solution for a sufficient period of time to cause complete ozonation of the starter PIB. The ozone is generally bubbled into the solution at a rate of at least 2 Liters per minute. The time of the bubbling is dependent on the rate of the bubbling, the level of ozone being bubbled in, the amount of the starter PIB present in solution, the degree of unsaturation in the starter PIB and the volume of the reaction. In addition, the required time can be longer when the ozone is generated from a mixture of oxygen and carbon dioxide, which is done to lower the flash potential of the oxygen. Likewise use of butyl rubber having higher levels of isoprene requires a longer ozonation time. Generally, the time of ozonation ranges from 30 minutes to 6 hours, preferably from 30 minutes to 3 hours. The bubbling can optionally be conducted in the presence of sulfide compounds such as dibutyl sulfide or tetrahydrothiophene. After the ozonation reaction is completed the excess ozone is removed by bubbling an inert gas such as nitrogen through the solution or by bubbling carbon dioxide through the solution while maintaining the low temperature for a period of about 30 minutes to 1 hour. After the excess ozone has been removed a suitable reducing agent is added to the solution while it is still at the chilled temperature. The reducing agent is allowed to react at either room temperature or the solution is warmed to a temperature of from 60 to 100° C., depending on the reducing agent. The reducing agent is reacted for a period of about 30 minutes to 18 hours until the reduction is complete thereby forming the mono or diol functional PIB. The reducing agent can optionally be quenched by reducing the temperature to 0° C. and adding methanol.

If desired, the mono or diol functional PIB product from above can be further purified by any of a number of processes. In one process the mono or diol functional PIB is washed with one or more washes of deionized water, followed by one or more washes with 10% HCl, and then additional water washes and finally dried over $MgSO_4$ or $NaSO_4$. The dried product can then be filtered and concentrated in vacuo if desired. Alternatively, rather than drying over $MgSO_4$ or $NaSO_4$, the water can be removed by using sequential azeotropic distillations with additional solvent, heptane in a preferred embodiment. In another process rather than using acid and water washes followed by drying the mono or diol functional PIB is subjected to an acidic treatment followed by filtration. The acidic media treatment may comprise use of acidic alumina, silica, or an acidic ion exchange resin such as the Amberlyst sulfonic acid cation exchange resins. The mono or diol functional PIB is first reacted with the acidic media at a temperature of 60° C. for about 3 hours. The media is then removed by filtration or decanting the solution. The product can then be further concentrated in vacuo or directly fed into a further functionalization reaction.

Alternatively, to any washing or clean up, the resulting mono or diol functional PIB product can be directly taken into a variety of secondary reaction procedures to further functionalize the mono or diol functional PIB. One of the advantages of the present process is that both the exo and endo double bonds present in functional PIBs, such as those in the Glissopal® starter PIBs, react in the process and result in formation of the alcohol functions. Thus, the present process results in a higher level of hydroxyl functionality in the PIB product. The exo double bonds result in formation of a secondary alcohol function while the endo double bonds result in formation of a primary alcohol function. The ozonation reduction process of the present invention is simpler in that it requires only a single solvent for both the ozonation and reduction steps and the product can be taken directly into a subsequent reaction process to produce monofunctional (PIB macromonomer) or difunctional (meth)acrylates. It can be done as a "one pot" procedure since no filtration or solvent exchanges are required when going from the starter PIB to mono or diol functional PIB to mono or di(meth)acrylate functionalized PIBs. The present process reduces processing time, labor, reagent usage, and costs.

In one secondary reaction procedure the mono or diol functional PIB is taken directly into a polyurethane reaction procedure followed by a (meth)acrylate capping reaction procedure. Alternatively, the mono or diol functional PIB can be taken directly into a (meth)acrylate capping reaction procedure. As is known in the art, polyurethanes can be formed by reacting polyisocyanates with polyols, which are polymers having alcohol functions, in the presence of one or more suitable catalysts such as tertiary amines like 1,4-diazabicyclo[2.2.2]octane (DABCO) or metallic compounds such as bismuth octanoate. In the present invention the (meth)acrylate capping is preferably carried out using either a transesterification reaction or an esterification reaction. In the transesterification reaction the alcohol functional PIB is reacted with a (meth)acrylate in the presence of a suitable catalyst under reflux conditions to produce the (meth)acrylate caps at the site of the original alcohol functionality. Alternatively, the esterification reaction can be performed by two other methods. In a first esterification reaction the alcohol functional PIB or polyurethane functional PIB is reacted with (meth)acrylic anhydride in the presence of one or more suitable catalysts at suitable temperatures to produce the (meth)acrylate capped PIB or (meth)acrylate capped polyurethane PIB and the excess methacrylic anhydride is removed by passing through a silica gel column. In an alternative esterification procedure, the mono or diol functional PIB or polyurethane functional PIB is reacted with acryloyl chloride in the presence of an amine and one or more suitable catalysts at a suitable temperature to produce the (meth)acrylate capped PIB or (meth)acrylate capped polyurethane PIB. In yet another process, the (meth)acrylate capping can be performed by reaction of mono or dihydroxy functional PIB's with isocyanate functional (meth)acrylates in the presence of a suitable catalyst.

An advantage of the (meth)acrylate capped PIBs produced by the present ozonation, reduction, (meth)acrylation route starting from starter PIBs, such as the Glissopal®, of the present invention compared to the process starting from PIBSA is that the functional PIBs produced according to the present invention have a lower viscosity due to the absence of the carboxyl acid group as compared to those present in (meth)acrylate capped PIBs produced by ring opening of the anhydride functional PIBSA. The lower viscosity of the functional PIBs according to the present invention can be seen visibly in the flow rate of the products produced according to the present invention versus those produced from PIBSA. Thus, the present inventive process produces carboxylic acid free PIB macromonomers.

The starter PIBs useful in the present invention include all olefin functional PIBs including those having endo or exo double bonds, allyl groups and mixtures thereof as well as butyl rubber and mixtures of these polymers. The starter PIBs can also include at least one phenyl group in the PIB backbone. A commercial example of such an olefin functional PIB phenyl is Epion EP 400, available from Kaneka, which includes a single phenyl group in the PIB backbone, terminal allyl groups, and has a molecular weight of approximately 10,000. Commercial examples of olefin functional PIBs having endo and exo double bonds include the Glissopal® PIBs available from BASF that include at least 70% alpha-olefin functionality and which are available in a molecular weight of from about 1,000 to 2,300 Daltons. The butyl rubber starter PIBs used in the present invention can be of various molecular weights. Preferably the butyl rubber has a weight average molecular weight of at least 100,000 and an unsaturation of about 0.8 mole % to 3.0 mole %. The unsaturation in the butyl rubber comes from the presence of isoprene units, which is also the site where the ozonation reaction occurs thereby resulting in the cleavage of the butyl rubber backbone and formation of the hydroxyl functionality at that site after reduction. This is why subjecting, for example, a 100,000 molecular weight butyl rubber with an unsaturation of approximately 0.95 mole %±0.2% results in diol functional PIBs having molecular weight of about 6,000 to 14,000 Daltons. Additionally, this is why the resulting diol functional PIB has no residual isoprene units and is referred to in the present specification and claims as diol functional PIB and not as a diol butyl rubber polymer.

The ozonation reduction steps discussed above preferably are conducted in an organic solvent comprising a hydrocarbon solvent. Preferably the solvent is chosen to be compatible with both the ozonation—reduction process and any subsequent polyurethane reaction or (meth)acrylate capping procedure. Especially suitable solvents include hydrocarbon solvents such as hexane, heptane, toluene, dichloromethane and synthetic hydrocarbons. Examples of suitable synthetic hydrocarbons include the Exxsol™ solvents, Isopar™ M, Isopar™ H and Isopar™ E, all available from ExxonMobil. The starter PIB is initially solubilized in the solvent, this is preferably done at temperatures of from 40 to 100° C. with stirring for a period of about 30 minutes to 3 hours. Once solubilized in the solvent the reaction mixture is cooled to a temperature of +10° C. or lower, preferably to a temperature below the flash point of the solvent ranging from about −4° C. to as low as a temperature just above the freezing temperature of the solubilized polymer in the solvent, more preferably at a temperature of from −10 to −30° C. Then ozone is bubbled into the solution to begin the ozonation process while maintaining the reduced temperature. The ozonation process is carried out for a period of time of from 30 minutes to 6 hours, preferably 30 minutes to 3 hours. As discussed above the amount of time required for the complete ozonation varies depending on such factors as the rate of ozone bubbling, starter PIB characteristics, and reaction volume. Optionally, one can add a catalytic amount of dibutyl sulfide, which can be up to a 1:1 stoichiometric ratio based on the amount of olefin present in the starter PIB, into the solution during the ozonation process, especially when the starting material is one having endo and exo double bonds. This is done to facilitate the reduction of ozonide groups. Other possible reducing agents to add at this point include tetrahydrothiophene. When the solution becomes saturated with ozone generally a blue color is observed in the solution from the excess ozone gas, but ozone is still bubbled in for the entire time.

Once the ozonation reaction is complete, the excess ozone is removed from the solution by bubbling an inert gas, such as nitrogen, or carbon dioxide into the solution. The disappearance of the blue color is one indication that the excess ozone has been removed. The bubbling of the inert gas is typically performed for a period of time of 30 minutes to 1 hour. While maintaining the inert gas atmosphere, a reducing agent is added to the solution and then the solution is warmed to room temperature or heated and maintained at a temperature of from 60 to 100° C. as required by the identity of the reducing agent for a period of about 30 minutes to 18 hours, preferably 4 to 18 hours, with stirring. The suitable reducing agents include one or more of the following: lithium aluminum hydride ($LiAlH_4$); sodium bis(2-methoxyethoxy)aluminum hydride (Red-Al®); borane; borane:dimethyl sulfide complex ($BH_3$:DMS); sodium bis(2-methoxyethoxy)aluminum hydride with dibutyl sulfide; BH3:tetrahydrofuran complex with or without dibutyl sulfide; BH3:Tetrahydrofuran complex with tetrahydrothiophene; BH3:Tetrahydrofuran complex with triethylphosphite; triphenylphosphine; triethylphosphite; sodium borohydride; tetrabutylammonium borohydride; and mixtures of these reducing agents. After completion of the reduction reaction the solution is cooled to about 0° C. Optionally, methanol is added to quench the excess reducing agent. Alternatively, the excess reducing agent can be quenched with water or an acid. The functional PIB product obtained by the above process can be further purified as described below. In one process the functional PIB is washed one or more times with deionized water, followed by one or more washes with 10% HCl, and then additional water washes and finally dried over $MgSO_4$ or $NaSO_4$. The dried product can then be filtered and concentrated in vacuo if desired. Alternatively rather than drying over $MgSO_4$ or $NaSO_4$, the water can be removed by using sequential azeotropic distillations with additional solvent, heptane in a preferred embodiment. In another process rather than using acid and water washes followed by drying the functional PIB is subjected to an acidic treatment followed by filtration. The acidic media treatment may comprise use of acidic alumina, silica, or an acidic ion exchange resin such as the Amberlyst sulfonic acid cation exchange resins. The functional PIB is first reacted with the acidic media at a temperature of 60° C. for about 3 hours. The media is then removed by filtration or decanting the solution. The product can then be further concentrated in vacuo at <1 Torr and a temperature of 40 to 80° C. or directly fed into a further functionalization reaction. The product can be characterized by $^1H$ NMR, Gel Permeation Chromatography, and hydroxyl number analysis techniques.

When the starter PIB is butyl rubber, all of the unsaturation from the isoprene units is lost so the product is a diol functional PIB. So, for example, a butyl rubber starting material with a molecular weight of approximately 100,000 with approximately 0.95 mole %±0.2% unsaturation will yield diol functional PIBs having molecular weights of from about 6,000 to 14,000 Daltons. These diol functional PIBs include both primary and secondary alcohol terminal end functions. Similarly, the hydroxyl functional PIBs formed from starter PIBs like the Glissopal® starter PIBs having endo and exo double bonds provide primary and secondary hydroxyl functionalities. The diol functional PIBs formed from butyl rubber were characterized using $^1H$ NMR analysis and showed the presence of the primary and secondary alcohol in the diol functional PIB product and disappearance of the butyl rubber precursor olefin signal. When the starter PIB includes or comprises butyl rubber, the ozonation and reduction steps are conducted in the same manner as described herein for olefin functional PIBs used as the starter PIB. The same solvents, reducing agents and processing procedures are used.

The mono and diol functional PIBs produced according to the ozonation and reduction process of the present invention can be further functionalized in a wide variety of ways. In one example the mono and/or diol functional PIBs are subjected to reaction with isocyanates to add polyurethane functionality at the hydroxyl function of the mono or diol functional PIB. The isocyanate can be a monoisocyanate or a polyisocyanate. In one preferred embodiment the isocyanate utilized includes a (meth)acrylate functional isocyanate such as 2-isocyanatoethyl (meth)acrylate to provide a (meth)acrylate capped polyurethane PIB product. The reaction between isocyanates and alcohol functions, polyols, is well known in the art and one of skill in the art can prepare any desired polyurethane functional PIB using known techniques. Briefly, the mono or diol functional PIB is reacted with an isocyanate in the presence of a suitable catalyst resulting in the formation of a polyurethane functional PIB. Suitable isocyanates can include, by way of example: monoisocyanates such as (meth)acryloxyethyl isocyanate; and isocyanates having the general structure of O=C=N—X—N=C=O wherein X is an aliphatic, alicyclic or aryl radical, preferably an aliphatic, alicyclic or aryl radical containing 4 to 18 carbon atoms. Other suitable isocyanates include 1,5-naphthylene diisocyanate; methylene diphenyl diisocyanate (MDI); hydrogenated MDI (HMDI); xylylene diisocyanate (XDI); tetramethyl xylylene diisocyanate (TMXDI); di- and tetraalkylene diphenylmethane diisocyanate; 4,4'-dibenzyl diisocyanate; 1,3-phenylene diisocyanate; 1,4-phenylene diisocyanate; 1-methyl-2,4-diisocyanatocyclohexane; 1,6-diiso-cyanato-2,2,4-trimethyl hexane; 1,6-diisocyanato-2,4,4-trimethyl hexane; 1-isocyanatomethyl-3-isocyanato-1,5,5-trimethyl cyclohexane (IPDI); chlorinated and brominated diisocyanates; phosphorus-containing diisocyanates; 4,4'-diisocyanatophenyl perfluoroethane; tetramethoxybutane-1,4-diisocyanate; butane-1,4-diisocyanate; hexane-1,6-diisocyanate (HDI); dicyclohexylmethane diisocyanate; cyclo-hexane-1,4-diisocyanate; ethylene diisocyanate; phthalic acid-bis-isocyanatoethyl ester; diisocyanates containing reactive halogen atoms such as 1-chloromethylphenyl-2,4-diisocyanate, 1-bromomethylphenyl-2,6-diisocyanate or 3,3-bis-chloromethylether 4,4'-diphenyl diisocyanate; methylene triphenyl triisocyanate (MIT); 2,4- or 4,4'-diphenyl methane diisocyanate (MDI); the isomers of toluene diisocyanate (TDI); and naphthalene-1,5-diisocyanate (NDI). Additional suitable isocyanates include isocyanate terminated oligomers and prepolymers. Such prepolymers can be formed by reacting an excess amount of polyisocyanate with a polyol, a polyamine, a polythiol, or mixtures thereof.

Other suitable isocyanates include isocyanates containing methacrylates, acrylates and styrene derivatives. Examples of these include: 2-isocyanatoethyl methacrylate, 2-isocyanatoethyl acrylate and 3-isopropenyl-α,α-dimethylbenzyl isocyanate, which are all commercially available. Reaction of mono or diol functional PIBs with these isocyanates would give (meth)acrylate or styrene end capped PIBs.

Aliphatic polyisocyanates with two or more isocyanate functionalities formed by biuret linkage, uretdione linkage, allophanate linkage, and/or by trimerization are suitable. Suitable at least trifunctional isocyanates are polyisocyanates formed by trimerization or oligomerization of diisocyanates or by reaction of diisocyanates with polyfunctional compounds containing hydroxyl or amino groups. Isocyanates suitable for the production of trimers are the diisocyanates mentioned above, the trimerization products of HDI, MDI, TDI or IPDI being particularly preferred.

The polymeric isocyanates formed, for example, as residue in the distillation of diisocyanates are also suitable for use. The polymeric MDI obtainable from the distillation residue in the distillation of MDI is suitable. The polyisocyanate component encompasses both a single polyisocyanate or a mixture of two or more polyisocyanates.

As is known in the art suitable catalysts which accelerate the isocyanate-polyol reaction can be used, including tertiary amines, organo metallic compounds or mixtures thereof. Tertiary amines such as triethylenediamine; dimethylethanolamine; triethanolamine; N-ethyl morpholine; N-methyldicyclohexylamine; N,N-dimethyl cyclohexylamine; N,N,N',N'-tetramethyl-1,3-butanediamine; 1,4-diazabicyclo[2.2.2]octane (DABCO) and the like can be used. Organo metallic compounds such as tin compounds, such as stannous octoate; stannous chloride; dibutyltin dilaurate; dibutyltin diacetate; dibutyltin-di-2 ethyl hexoate; bismuth octanoate, zinc octanoate and the like can be used. Catalysts are not strictly required for the reaction, so the amount of catalyst used can range from about 0.00 to about 1 weight percent and in another embodiment from about 0.03 to about 0.06 weight percent, based on the total weight of the formulation.

Preferably, the process includes formation of 1 polyurethane at each site of a hydroxy function. The formed polyurethane PIB polymer can then be capped with (meth) acrylate by any of a variety of processes of not already a (meth)acrylate capped isocyanate, as discussed herein, to form di(meth)acrylate polyurethane functional PIBs and mono(meth)acrylate polyurethane functional PIBs or distyrenic polyurethane functional PIBs or monostyrenic polyurethane functional PIBs depending on the number of alcohol functions in the PIB produced in the ozonation reduction step.

The mono or diol functional PIB product from the ozonation reduction process of the present invention can be capped with (meth)acrylate by any of several esterification processes including: transesterification with a (meth)acrylate; esterification using methacrylic anhydride; and esterification using acryloyl chloride.

In a transesterification process according to the present invention, the mono or diol functional PIB product from the ozonation reduction process is combined with an organic solvent, preferably the same solvent as used for the ozonation reduction process, the desired (meth)acrylate, and a transesterification catalyst. Especially suitable solvents include hydrocarbon solvents such as hexane, heptane, toluene, dichloromethane and synthetic hydrocarbons. Examples of suitable synthetic hydrocarbons include the Exxsol™ solvents, Isopar™ M, Isopar™ H and Isopar™ E, all available from ExxonMobil. The suitable (meth)acrylates include: methyl (meth)acrylate, ethyl (meth)acrylate, propyl (meth)acrylate, butyl (meth)acrylate, pentyl (meth)acrylate, hexyl (meth)acrylate, phenyl (meth)acrylate, and mixtures thereof. Other suitable (meth)acrylates include (meth)acrylates described herein wherein the R group is a C1 to C12 aliphatic, aromatic, alicyclic, or aralkyl group. The preferred catalysts include: titanium tretraisopropoxide, and conventional acidic catalysts such as sulfuric acid or para-Toluene sulfonic acid, and mixtures thereof. The reaction mixture is warmed to approximately 40° to 80° C. to solubilize the mono or diol functional PIB and then heated to reflux and maintained at reflux temperatures, generally 90 to 120° C. for 30 minutes to 3 hours. Following sufficient refluxing the mixture is cooled to room temperature and then washed several times with deionized water and dried over dried with anhydrous $MgSO_4$ or anhydrous $Na_2SO_4$, filtered and concentrated in vacuo at <1 Torr and a temperature of from 40 to 80° C.

In an esterification reaction with methacrylic anhydride the mono or diol functional PIB is refluxed in a suitable solvent to solubilize it. The suitable organic solvents include those that do not take part in any of the reactions but will solubilize the reagents as described herein. Especially suitable solvents include hydrocarbon solvents such as hexane, heptane, toluene, dichloromethane and synthetic hydrocarbons. Examples of suitable synthetic hydrocarbons include the Exxsol™ solvents, Isopar™ M, Isopar™ H and Isopar™ E, all available from ExxonMobil. Preferably the solvent is heptane. Then the mixture is cooled to 0 to 60° C. depending on the conditions, and the methacrylic anhydride and a suitable base or Lewis acid catalyst are added and the solution is maintained at the appropriate temperature. Suitable catalysts include Lewis acids such as: bismuth trifluoromethanesulfonate, scandium trifluromethanesulfonate, indium trifluoromethanesulfonate, and others know to those of skill in the art. Suitable base catalysts include triethylamine. A preferred catalyst is dimethylaminopyridine. After a suitable reaction period the mixture is filtered through a silica gel to remove residual methacrylic acid, residual methacrylic anhydride, and catalyst. The product can be washed several times with deionized water, dried over anhydrous $MgSO_4$ or anhydrous $Na_2SO_4$ and the solvent removed in vacuo at <1 Torr and a temperature of 40 to 80° C. The product is characterized by $^1H$ NMR analysis. Depending on the starting mono or diol functional PIB the product is either a mono(meth)acrylate PIB (PIB macromonomer) or a di(meth)acrylate PIB. The product can then serve as a precursor in a wide variety of other reactions to form the end products discussed herein.

In an esterification reaction with acryloyl chloride the mono or diol functional PIB is first solubilized in the appropriate solvent at 60° C. The suitable organic solvents include those listed herein. Preferably the solvent is heptane. Then, based on the hydroxyl number of the mono or diol functional PIB, excess acryloyl chloride, excess base, and optionally a catalyst are added. The preferred bases are tertiary amines such as triethylamine and the catalysts include amidines bases such as 4-dimethylaminopyridine and preferably the 4-dimethylaminopyridine used at a level of 10 mole %. The esterification is carried out at a temperature of from 0 to 20° C. for a period of about 5 to 18 hours. The product can then filtered, washed with deionized water, dried over anhydrous $MgSO_4$ or anhydrous $Na_2SO_4$ and concentrated in vacuo at <1 Torr and a temperature of from 40 to 80° C. As discussed herein other purification processes can be used. The product can be characterized by $^1$H NMR analysis.

EXAMPLES

Example 1 is formation of a diol functional PIB phenyl from an olefin functional PIB phenyl, of approximately 9,000 to 10,000 in molecular weight. The starter used as Epion EP400, a diallyl PIB phenyl. The process was according to the present invention through an ozonation and reduction reaction starting with the olefin functional PIB phenyl. The reaction was conducted in a 1 L resin kettle equipped with a stainless steel stir blade, controlled heating and cooling, a water condenser, a thermoprobe, and an inlet purge. To the kettle was added 100 g of the diallyl PIB phenyl and 600 ml of heptane and this mixture was stirred for approximately 1 hour at 80° C. to completely dissolve the diallyl PIB phenyl. The mixture was then cooled to −20° C. and ozone was bubbled into the mixture for about 2 hours, until a blue color appeared indicating excess ozone meaning the solution was fully saturated. Then the temperature was maintained at −20° C. overnight with bubbling of nitrogen into the solution to remove the unreacted ozone. In the morning no blue color was observed. The solution was then warmed to 25° C. and then 50 g of sodium bis(2-methoxyethoxy)aluminum hydride, from a 65% solution in toluene from Sigma Aldrich, was added over a 20 minute period. Then the temperature was raised to 80° C. and maintained for 2 hours. The reaction mixture was then cooled to a room temperature of approximately 25° C. and maintained with stirring overnight. In the morning another 200 ml of heptane was added to replenish what had been lost and the reaction mixture was cooled to 0° C. and then 100 ml of methanol was added to quench the catalyst. The mixture was warmed to 25° C. while adding 250 ml of a 10% HCl solution. The reaction mixture was stirred and then transferred to a separatory funnel to allow the organic layer to separate out. The organic layer was washed again with 250 ml of the 10% solution of HCl and then with 250 ml of deionized water. The collected organic layer was then dried over anhydrous $MgSO_4$, pressure filtered, and concentrated in vacuo at 80° C. to provide the diol-PIB phenyl polymer. It was a pale opaque colorless product and the recovery was 88.2 g of product. The formation of the primary alcohols in the diol functional PIB phenyl was confirmed by $^1$H NMR analysis of the product. The product had an OH number of 15.108, an equivalent weight of 3713 and an Mn of about 9600.

Example 2 is a conversion of the product from example 1, a diol functional PIB phenyl, into a di(meth)acrylate functional PIB phenyl using a transesterification reaction according to the present invention. A 500 ml round bottom flask was equipped with an external oil bath, a magnetic stirrer, thermoprobe, a thermal controller, air inlet, and an Oldershaw distillation column with a Dean-Stark trap. The following were added to the flask: 50 g, 6.02 mmols, of the diol-PIB phenyl polymer from example 1; 5.4 g, 42.14 mmols of butyl acrylate; 200 ml of heptane; 0.12 g, 0.40 mmols, of a catalyst, in this example titanium tetraisopropoxide. The mixture was warmed to dissolve the diol-PIB phenyl polymer and then further warmed to 100-110° C. where reflux occurred. Subsequently more heptane was added, two doses of 200 ml each, and it refluxed at near 100° C. As the reflux was continued most of the solvent was used and the mixture in the flask began to thicken and the temperature had risen to 120 to 130° C. Another 200 ml of heptane was added and the reflux was continued, reflux began at 98° C. and increased slowly to 110° C. The complete azeotropic distillation of the alcohol from the solvent was completed as indicated by collection of the azeotrope and the temperature rise. Then an additional 200 ml of heptane was added and the reaction mixture was allowed to cool to room temperature overnight. The next morning an additional 200 ml of heptane was added and the organic was washed with 200 ml of deionized water and then dried over anhydrous $MgSO_4$. The product, a pale resin, was then gravity filtered through fluted paper and concentrated in vacuo at <1 Torr and 60° C.

Example 3 is a transesterification of a starter PIB comprising a diol functional PIB, G-1000 from Nisso Soda Co. LTD. The G-1000 is a polyisobutylene having terminal hydroxy functions and a number average molecular weight of 1,400. A 250 ml round bottom flask was equipped with a magnetic stir bar, an external oil bath, a thermoprobe, a thermocontroller, nitrogen inlet, and Oldershaw distilling column with and Deen-Stark trap. To the flask the following were added: 37 mmols of the G-1000, 129.5 mmols of butyl acrylate, and 200 ml of toluene followed by 0.4 mmols of tetraisoprpyl titanate. The mixture was warmed to dissolve the G-1000, and then the temperature was raised to 111° C. where reflux occurred. The reflux was continued for 5 hours. During this time sequential 20 ml volumes of distillate were removed as the temperature continued to rise. The final temperature was approximately 136° C. by the time 160 ml of distillate had been removed. The distillate was allowed to cool overnight. The recovered mixture was dissolved in 100 ml of toluene and treated with 30 g of neutral alumina and 10 g of Celite 591. The solution was then filtered and the filtrate was treated with 5 g of activated carbon. The carbon treated product was then filtered through the previous pad of alumina and Celite 591 and then the pad was rinsed with additional toluene. The final filtrate was concentrate in vacuo at <1 Torr and 50° C. to produce the final transesterified product.

Example 4 is a scaled up of the procedure according to example 1. In this process a jacketed 5 L reactor was equipped with an agitator blade/shaft, thermoprobe and inlet purge. The following were added to the reactor: 243.90 g of the diallyl PIB phenyl and 1389 g of heptane. The reaction was stirred at 40° C. until the polymer was completely dissolved. Next 1 g of dibutyl sulfide was added and the solution was cooled to −12° C. Then ozone was bubbled into the solution for approximately 2 hours. Nitrogen was then bubbled through the solution for 30 minutes to remove the ozone. Then 54.50 g of the reduction catalyst $LiAlH_4$ was added. The solution was then warmed to room temperature where after 90 minutes the solution had solidified. Next 1000 ml of a 10% HCl solution was added, and the solution was allowed to stir for three hours to allow the polymer to resolubilize into the solution. Then the agitation was stopped and the aqueous layer was removed. The organic layer was washed again twice with 1N HCl, 5000 ml per wash, and then it was washed three times with 5000 ml each time of deionized water. The organic layer was then dried over anhydrous $NaSO_4$, pressure filtered, and concentrated in vacuo at 45° C. to provide a pale turbid viscous resin.

Example 5 describes the preparation of a mono hydroxy functional PIB from a commercially available Glissopal® grade highly reactive PIB having an alpha-olefin content of greater than 70% and a molecular weight of 2300. The following were added to a 1 L reactor equipped with ozone bubbler and a nitrogen inlet: 170 g, 43.5 mmol, of the starter Glissopal® PIB and 600 ml of heptane. The mixture was stirred at 80° C. to dissolve the PIB polymer. The mixture was then cooled to −10 to −20° C. under a nitrogen flush. Then a catalytic amount of 2.16 g, 14.7 mmol, of dibutyl sulfide was added and ozone was bubbled into the reaction mixture until a blue color was obtained indicating the presence of excess ozone. Ozone was further bubbled for another 1 hour followed by nitrogen bubbling until the blue color disappeared indicating removal of the excess ozone. The mixture was transferred to a 1 L 3 necked flask. Under a nitrogen atmosphere, 42.4 ml of a 65 wt % solution of sodium bis(2-methoxyethoxy)aluminum hydride in toluene, 130 mmol, was added. The mixture was stirred at room temperature for 1 hour and then heated to 80° C. for 4 hours. The reaction mixture was then cooled with an ice-water mixture, and the excess sodium bis(2-methoxyethoxy)aluminum hydride was quenched using methanol. Then 300 ml of a 10% aqueous HCl solution was added and the product was extracted with heptane, washed with water and dried over anhydrous $Na_2SO_4$ as in the examples above. The solvent was then evaporated to give the mono hydroxyl functional PIB, 146 g, 86%, as a mixture of primary and secondary alcohols produced respectively from the endo and the exo double bonds present in the Glissopal® as confirmed by $^1$H NMR analysis.

Example 6 describes the preparation of methacrylate derivatives of the mono hydroxyl functional PIB of example 5 (alternatively called a PIB macromonomer). The following were added to a 500 ml flask equipped with a magnetic stir bar and reflux condenser: 42 g, 20 mmol, of the mono hydroxyl functional PIB of example 5 and 300 ml of hexane. The mixture was refluxed until all of the mono hydroxyl functional PIB went into solution. Then 9.2 g, 60 mmol, of methacrylic anhydride; 1.3 g, 2 mmol, of bismuth trifluoromethanesulfonate; and 200 ppm of methylhydroquinone were added and the mixture was heated at 60° C. for 3 hours. After cooling to room temperature the mixture was filtered through a pad of silica gel to remove residual methacrylic anhydride, methacrylic acid and the Lewis acid. The solvent was removed in vacuum. Analysis by $^1$H NMR showed the product to be the mono (meth)acrylate functional PIB (PIB macromonomer), it was a pale yellow viscous liquid, 42 g, 90%.

Example 7 describes the preparation of a mixture of mono and diol functional PIB from a starting polymer mixture containing butyl rubber 2.3% unsaturation and Glissopal® PIB with a molecular weight of 2,300 and having an alpha-olefin content of greater than 70%. To a 2 L 3 necked flask equipped with a mechanical stirrer and gas inlet the following were added: 200 g of butyl rubber, 82 mmol; 300 g of the Glissopal® PIB, 130 mmol; 7.2 g, 49 mmol, of butyl sulfide; and 500 ml of heptane. The mixture was stirred with mechanical stirring until it became homogenous. After cooling to −10 to −20° C. under a nitrogen atmosphere, ozone was bubbled through the mixture. A blue color was obtained, indicating saturation of the solution with ozone. Ozone was further bubbled for about 3 hours at the same temperature. Then nitrogen was bubbled to remove excess ozone from the solution. The solution was immediately transferred to a 2 L flask and cooled with an ice-water mixture. Then sodium bis(2-methoxyethoxy)aluminum hydride, 60 wt % solution in toluene, 179 g, 530 mmols, was added slowly and the mixture warmed to room temperature and stirred at 80° C. for about 3 hours. After cooling with ice-water mixture, excess sodium bis(2-methoxyethoxy)aluminum hydride was quenched by addition of methanol. Water was added and the product extracted with ethyl acetate, washed with water and dried over anhydrous $Na_2SO_4$. Solvent evaporation in a vacuum gave the product, which was a mixture of diol functional PIB and mono alcohol functional PIB. The ratio of the mono-alcohol and diol functional PIB polymers corresponded well to the starting material ratio as characterized by $^1$H NMR analysis, 430 g, 86%.

Example 8 describes the preparation of a mixture of di(meth)acrylate and mono (meth)acrylate functional PIB from the mixture produced in example 7 above. In a reaction vessel with a stirrer the following were combined and stirred at 60° C. for 3 hours: 102 g of the mixture of diol functional PIB and mono alcohol functional PIB from example 7, 48 mmol (hydroxyl functionality based on total hydroxyl number); 15.41 g, 100 mmol, of methacrylic anhydride; 3.3 g, 4.8 mmol, of bismuth trifluromethanesulfonate; 500 ppm of methylhydroquinone; and 300 ml heptane. After 3 hours the reaction mixture was cooled to room temperature and the solution was passed through a column of silica gel to remove residual methacrylic acid, residual methacrylic anhydride, and the Lewis acid. The solvent was then evaporated as described herein to give a blend of di(meth)acrylate and mono(meth)acrylate PIB polymers as characterized by $^1$H NMR analysis, 92 g, 90%, as a viscous liquid.

Example 9 describes the preparation of an extended polyurethane (meth)acrylate PIB starting from a hydroxyl functional polyisobutylene. The following were added to a jacketed 1 L reaction vessel equipped with a thermocouple and a mechanical stirrer: 653.21 g (0.114 moles) of hydroxyl functional polyisobutylene; 0.21 g (0.033 mmoles) of dibutyltin dilaurate; 0.36 g (0.030 mmoles) of 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester; and 0.36 g (0.003 moles) of 4-methoxyphenol. The contents were heated to 75° C. and allowed to mix for 30 minutes. Then 41.02 g (0.183 moles) of isophorone diisocyanate was added dropwise using an addition funnel. Once all of the isophorone diisocyanate had been added the contents were allowed to react for 3 hours. The amount of residual isocyanate was determined via titration. Then 18.93 g (0.131 moles) of hydroxyethylmethacrylate was added to the flask and allowed to react for another 3 hours at 75° C. The reaction product was confirmed by $^1$H NMR, it was a clear, colorless, highly viscous methacrylated polyurethane polyisobutylene, 661.5 g, 98.3% yield.

Example 10 describes a process of direct acrylation of a hydroxyl functional polyisobutylene. A 250 ml reaction vessel was equipped with a thermocouple and a mechanical stirrer. The following were added to the vessel: 123.28 g (0.021 moles) of hydroxyl functional polyisobutylene; 0.01 g (0.002 mmols) of dibutyltin dilaurate; 0.03 g (0.002 mmoles) of 3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester; and 0.03 g (0.020 moles) of 4-methoxyphenol. The contents were heated to 75° C. and mixed for 30 minutes. Then 3.06 g (0.215 moles) of 2-isocyanatoethylacrylate was added to the reaction vessel and allowed to react for 3 hours at 75° C. The isocyanate consumption was monitored via Fourier Transform InfraRed spectroscopy (FT-IR). Once the isocyanate had fully reacted the reaction was stopped. The product was a clear, colorless, highly viscous methacrylated polyurethane polyisobutylene, 125.14 g, 98.9% yield.

The present invention provides an innovative process for formation of mono alcohol and diol functional PIBs starting from a variety of olefin functional PIBs and butyl rubber. The process eliminates many of the problems associated with previous methods and enables further functionalization to polyurethanes and to urethane acrylates without the need for solvent exchanges, multiple filtration and purification steps. Using the present invention the transformation from functional PIBs to (meth)acrylate functional PIBs can be accomplished in a single reaction vessel and a single solvent system.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of forming a functional polyisobutylene having at least one terminal primary or secondary hydroxyl group comprising the steps of:
    a) providing an olefin functional polyisobutylene comprising at least one internal phenyl group and two terminal allyl groups;
    b) solubilizing the polymer in an organic solvent to form a polymer solution;
    c) subjecting the polymer solution to ozonation by bubbling ozone through the polymer at a temperature in the range of from +10° C. to a temperature that is greater than the freezing temperature of the polymer solution, optionally in the presence of a sulfide catalyst;
    d) treating the product of step c) at a temperature from 0 to 100° C. in the presence of a reducing agent thereby forming a functional polyisobutylene having at least one terminal primary or secondary hydroxyl group.

2. The method as recited in claim 1, wherein the polymer is an olefin functional polyisobutylene and contains an endo carbon to carbon double bond, an exo carbon to carbon double bond, or a mixture thereof on at least one terminal end.

3. The method as recited in claim 1, wherein the polymer further comprises butyl rubber as an additional polymer in step a).

4. A method of forming a functional polyisobutylene having at least one terminal primary or secondary hydroxyl group comprising the steps of:
    providing a polymer mixture of butyl rubber and at least one polymer selected from the group consisting of: an olefin functional polyisobutylene, the olefin functional polyisobutylene optionally including at least one internal phenyl group, and having one or more terminal allyl groups; an olefin functional polyisobutylene having an endo carbon to carbon double bond, an exo carbon to carbon double bond, or a mixture thereof on at least one terminal end; and mixtures thereof;
    solubilizing the polymer in an organic solvent to form a polymer solution;
    subjecting the polymer solution to ozonation by bubbling ozone through the polymer at a temperature in the range of from +10° C. to a temperature that is greater than the freezing temperature of the polymer solution, optionally in the presence of a sulfide catalyst; and
    treating the product of step c) at a temperature from 0 to 100° C. in the presence of a reducing agent thereby forming a functional polyisobutylene having at least one terminal primary or secondary hydroxyl group.

5. The method as recited in claim 1, wherein the organic solvent is selected from the group consisting of hexane, heptane, toluene, dichloromethane, a synthetic hydrocarbon, and mixtures thereof.

6. The method as recited in claim 1, wherein the reducing agent is selected from the group consisting of: sodium bis(2-methoxyethoxy) aluminum hydride; a mixture of a bis(2-methoxyethoxy) aluminum hydride with dibutyl sulfide; lithium aluminum hydride ($LiAlH_4$); borane; a borane:dimethyl sulfoxide complex; borane:tetrahydrofuran complex; a mixture of a borane:tetrahydrofuran complex with dibutyl sulfide or tetrahydrothiophene, or triethylphosphite; sodium borohydride; tetrabutylammonium borohydride; triphenylphosphine; triethylphosphite; and mixtures thereof.

7. The method as recited in claim 1, wherein a catalytic amount of dibutyl sulfide or tetrahydrothiophene is present in step c).

8. The method as recited in claim 1, further comprising after step c) the step of removing the ozone from the polymer solution prior to step d).

9. A method of forming a functional polyisobutylene comprising the steps of:
    a) providing at least one polymer selected from: an olefin functional polyisobutylene, the olefin functional polyisobutylene optionally including at least one internal phenyl group; butyl rubber; and mixtures thereof;
    b) solubilizing the polymer in an organic solvent to form a polymer solution;
    c) subjecting the polymer solution to ozonation by bubbling ozone through the polymer at a temperature in the range of from +10° C. to a temperature that is greater than the freezing temperature of the polymer solution, optionally in the presence of a sulfide catalyst;
    d) treating the product of step c) at a temperature from 0 to 100° C. in the presence of a reducing agent thereby forming a functional polyisobutylene having at least one terminal primary or secondary hydroxyl group;
    e) forming a mixture comprising the functional polyisobutylene of step d), an organic solvent, a catalyst, and a $C_1$ to $C_{12}$ (meth)acrylate or acroyl chloride or methacrylic anhydride and reacting the mixture at a temperature from 40 to 80° C. for a period of time to form a functional polyisobutylene having at least one (meth)acrylate terminal end.

10. The method as recited in claim 9, wherein the catalyst in step e) is titanium tetraisopropoxide.

11. The method as recited in claim 9, wherein the (meth)acrylate is selected from the group consisting of: methyl (meth)acrylate; ethyl (meth)acrylate; propyl (meth)acrylate; butyl (meth)acrylate; pentyl (meth)acrylate; hexyl (meth)acrylate; phenyl (meth)acrylate; a (meth)acrylate containing a $C_1$ to $C_{12}$ aliphatic, aromatic, alicyclic, or aralkyl group; and mixtures thereof.

12. A method of forming a functional polyisobutylene comprising the steps of:
    a) providing at least one polymer selected from: an olefin functional polyisobutylene, the olefin functional polyisobutylene optionally including at least one internal phenyl group; butyl rubber; and mixtures thereof;
    b) solubilizing the polymer in an organic solvent to form a polymer solution;
    c) subjecting the polymer solution to ozonation by bubbling ozone through the polymer at a temperature in the range of from +10° C. to a temperature that is greater than the freezing temperature of the polymer solution, optionally in the presence of a sulfide catalyst;

d) treating the product of step c) at a temperature from 0 to 100° C. in the presence of a reducing agent thereby forming a functional polyisobutylene having at least one terminal primary or secondary hydroxyl group;

e) reacting the functional polyisobutylene from step d) with at least one isocyanate in presence of a suitable catalyst to form a functional polyisobutylene having at least one terminal urethane end; and f) forming a mixture comprising the functional polyisobutylene of step e), an organic solvent, a catalyst, and a $C_1$ to $C_{12}$ (meth)acrylate or acrolyl chloride or methacrylic anhydride and reacting the mixture at a temperature from 40 to 80° C. for a period of time to form a functional polyisobutylene having at least one methacrylate capped urethane terminal end.

13. The method as recited in claim 12, wherein the catalyst in step f) is titanium tetraisopropoxide.

14. A method of forming a functional polyisobutylene comprising the steps of:

a) providing at least one polymer selected from: an olefin functional polyisobutylene, the olefin functional polyisobutylene optionally including at least one internal phenyl group; butyl rubber; and mixtures thereof;

b) solubilizing the polymer in an organic solvent to form a polymer solution;

c) subjecting the polymer solution to ozonation by bubbling ozone through the polymer at a temperature in the range of from +10° C. to a temperature that is greater than the freezing temperature of the polymer solution, optionally in the presence of a sulfide catalyst;

d) treating the product of step c) at a temperature from 0 to 100° C. in the presence of a reducing agent thereby forming a functional polyisobutylene having at least one terminal primary or secondary hydroxyl group; and e) reacting the functional polyisobutylene from step d) with at least one isocyanate containing a (meth)acrylate group in the presence of a suitable catalyst to form a (meth)acrylate functional polyisobutylene having at least one terminal urethane end.

\* \* \* \* \*